(12) United States Patent
Wang et al.

(10) Patent No.: US 9,691,384 B1
(45) Date of Patent: Jun. 27, 2017

(54) VOICE ACTION BIASING SYSTEM

(71) Applicant: Google Inc., Mountain View, CA (US)

(72) Inventors: Bo Wang, San Jose, CA (US); Sunil Vemuri, Pleasanton, CA (US); Barnaby John James, Los Gatos, CA (US); Scott B. Huffman, Portola Valley, CA (US); Pravir Kumar Gupta, Los Altos, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/241,538

(22) Filed: Aug. 19, 2016

(51) Int. Cl.
*G10L 15/00* (2013.01)
*G10L 15/22* (2006.01)
*G10L 17/22* (2013.01)
*G10L 15/18* (2013.01)

(52) U.S. Cl.
CPC .............. *G10L 15/22* (2013.01); *G10L 15/18* (2013.01); *G10L 17/22* (2013.01); *G10L 2015/223* (2013.01)

(58) Field of Classification Search
CPC .......... G10L 15/30; G10L 15/265; G06F 9/30
USPC ....................................................... 704/275
See application file for complete search history.

(56) References Cited

U.S. PATENT DOCUMENTS

| | | |
|---|---|---|
| 5,632,002 A | 5/1997 | Hashimoto |
| 5,732,395 A | 3/1998 | Silverman |
| 6,125,347 A | 9/2000 | Cote |
| 6,192,343 B1 | 2/2001 | Morgan |
| 6,363,348 B1 | 3/2002 | Besling et al. |
| 6,374,226 B1 | 4/2002 | Hunt |
| 6,442,522 B1 | 8/2002 | Carberry |
| 6,615,177 B1 | 9/2003 | Rapp |
| 6,748,361 B1 | 6/2004 | Comerford et al. |
| 7,013,282 B2 | 3/2006 | Schroeter |
| 7,167,831 B2 | 1/2007 | Falcon |

(Continued)

OTHER PUBLICATIONS

Bulyko et al. "Web Resources for Language Modeling in Conversational Speech Recognition," ACM Trans. on Speech and Language Processing, Dec. 2007, 25 pages.

(Continued)

*Primary Examiner* — Daniel Abebe
(74) *Attorney, Agent, or Firm* — Brake Hughes Bellermann LLP

(57) ABSTRACT

Methods, systems, and apparatus for determining that a software application installed on a user device is compatible with a new voice action, wherein the new voice action is specified by an application developer of the software application. One or more trigger terms for triggering the software application to perform the new voice action are identified. An automatic speech recognizer is biased to prefer the identified trigger terms of the new voice action over trigger terms of other voice actions. A transcription of an utterance generated by the biased automatic speech recognizer is obtained. The transcription of the utterance generated by the biased automatic speech recognizer is determined to include a particular trigger term included in the identified trigger terms. Based at least on determining that the transcription of the utterance generated by the biased automatic speech recognizer includes the particular trigger term, execution of the new voice action is triggered.

20 Claims, 5 Drawing Sheets

(56) References Cited

U.S. PATENT DOCUMENTS

| | | | |
|---|---|---|---|
| 7,363,228 | B2 | 4/2008 | Wyss et al. |
| 7,412,391 | B2 | 8/2008 | Nakagawa et al. |
| 7,877,258 | B1 | 1/2011 | Chelba et al. |
| 7,899,673 | B2 | 3/2011 | Brown |
| 8,219,407 | B1 | 7/2012 | Roy |
| 8,239,206 | B1 | 8/2012 | LeBeau et al. |
| 8,301,448 | B2 | 10/2012 | Carcus |
| 8,370,146 | B1 | 2/2013 | Schalkwyk et al. |
| 8,532,675 | B1 | 9/2013 | Pasquero et al. |
| 8,626,511 | B2 | 1/2014 | LeBeau et al. |
| 8,682,661 | B1 | 3/2014 | Schalkwyk et al. |
| 8,731,939 | B1 | 5/2014 | LeBeau et al. |
| 8,751,217 | B2 * | 6/2014 | Ballinger ............... G10L 15/30 704/251 |
| 8,965,759 | B2 | 2/2015 | Hershenhorn |
| 9,047,870 | B2 * | 6/2015 | Ballinger ............... G10L 15/30 |
| 2002/0116194 | A1 * | 8/2002 | Lewis ................... G10L 15/197 704/257 |
| 2002/0133354 | A1 | 9/2002 | Ross |
| 2003/0236664 | A1 | 12/2003 | Sharma |
| 2004/0260562 | A1 | 12/2004 | Kujiral |
| 2006/0106614 | A1 | 5/2006 | Mowatt |
| 2007/0050191 | A1 | 3/2007 | Weider et al. |
| 2007/0094033 | A1 | 4/2007 | Nagashima et al. |
| 2007/0100636 | A1 | 5/2007 | Hirota et al. |
| 2008/0208585 | A1 | 8/2008 | Ativanichayaphong et al. |
| 2008/0270135 | A1 | 10/2008 | Goel et al. |
| 2009/0030691 | A1 | 1/2009 | Cerra |
| 2009/0171659 | A1 | 7/2009 | Pearce et al. |
| 2009/0171663 | A1 | 7/2009 | Badt et al. |
| 2009/0171664 | A1 | 7/2009 | Kennewick et al. |
| 2009/0216538 | A1 | 8/2009 | Weinberg et al. |
| 2010/0223060 | A1 | 9/2010 | Chang et al. |
| 2010/0286985 | A1 | 11/2010 | Kennewick et al. |
| 2010/0312547 | A1 | 12/2010 | Van Os et al. |
| 2010/0312782 | A1 | 12/2010 | Li et al. |
| 2011/0106534 | A1 | 5/2011 | LeBeau et al. |
| 2011/0131045 | A1 | 6/2011 | Cristo et al. |
| 2011/0144980 | A1 | 6/2011 | Rysenga |
| 2011/0153325 | A1 * | 6/2011 | Ballinger ............... G10L 15/30 704/235 |
| 2011/0196668 | A1 | 8/2011 | Shu et al. |
| 2012/0173244 | A1 | 7/2012 | Kwak et al. |
| 2012/0191449 | A1 * | 7/2012 | Lloyd ................... H04M 1/04 704/231 |
| 2013/0238326 | A1 | 9/2013 | Kim et al. |
| 2013/0246050 | A1 | 9/2013 | Yu et al. |
| 2013/0317823 | A1 | 11/2013 | Mengibar et al. |
| 2014/0195243 | A1 | 7/2014 | Cha et al. |
| 2014/0244271 | A1 | 8/2014 | Lindahl |
| 2014/0279233 | A1 | 9/2014 | Lau et al. |
| 2014/0288929 | A1 * | 9/2014 | Ballinger ............... G10L 15/30 704/235 |
| 2014/0343950 | A1 | 11/2014 | Simpson et al. |
| 2015/0019074 | A1 | 1/2015 | Winter et al. |
| 2015/0124944 | A1 | 5/2015 | Perotti et al. |
| 2015/0379981 | A1 | 12/2015 | Balasubramanian et al. |

OTHER PUBLICATIONS

LumenVox, "Grammars," retrieved on Jul. 31, 2010, http://www.lumenvox.com/pdf/grammars.pdf, 9 pages.

Taylor, P.A. "Concept-to-Speech Synthesis by Phonological Structure Matching." Center for Speech Technology Research, University of Edinburgh; The Royal Society, 2000, 14 pages.

* cited by examiner

VOICE ACTION BIASING SYSTEM

TECHNICAL FIELD

This specification relates to voice actions, and one particular implementation relates to voice action detection technology.

BACKGROUND

A task in a software application is a collection of one or more activities that a user interacts with when performing a certain job, where each activity is defined in the software application. Each activity is an instance of an activity class, and collectively the one or more activities in the collection control the life cycle of the execution of the task, such that the multiple activities exercised within the task can permit the user to perform the job. In some implementations, a command can be associated with an activity or an action related to an activity, such that a user submission of the command can trigger the activity or action. A specific intent can be fired to trigger the starting of the activity or performance of the action. Thus, to trigger the starting of the activity or performance of the action, a user must have knowledge of the command associated with the activity or action used to fire the intent corresponding to the activity or action.

SUMMARY

This specification describes a platform for biasing a speech recognition system to prefer trigger terms for new voice actions over other terms. In this specification, a new voice action is a voice action that is specified by an application developer of a previously installed software application. An application developer can use the platform to submit information defining a new voice action, where the information specifies a software application that has been previously released and installed on one or more user devices, an action that the application performs when the new voice action is issued by a user and recognized by the speech recognition system, a trigger term for triggering the action, and a context in which the trigger term is available to trigger the action in the application.

The context submitted by the application developer can specify a user device status when the voice action should be effective to trigger the action in the application. A device status can include, for example, which application(s) is operating in the foreground (i.e., currently active in a user interface of the device) or in the background (i.e., currently hidden from view in the user interface of the device), or can include specific information about applications, such as which activity is currently running, which activities are included on an activity stack, the status of the currently running activity or of one or more activities on the stack, and so on.

When the application developer submits information defining the new voice action, the platform, designed as a service or tool, can validate the information defining the new voice action to determine whether the new voice action is compatible with the application, or to otherwise determine whether the new voice action can be implemented. If the new voice action is valid, a new instance of a passive data structure called an intent and having a specific format can be created for the voice action by inducting the information defining the new voice action. The intent can specify some or all of the information defining the new voice action, such as the application, the trigger term, the activity or action to be triggered in response to detecting the trigger term, and context that is necessary for the trigger term to trigger the activity or action. The voice action can then be deployed for the application, such that the voice action becomes an enabled voice action for the application without additional alterations being made to the application code to support the voice action.

Once the voice action has been deployed, a user operating a user device can provide a speech input. The user device can submit context information for the user device, and the context information and a transcription of the speech input can be used to identify an intent and to trigger the identified intent. When the intent is triggered, data for executing the activity or action is determined, and is transmitted to the user device to execute the activity or action in response to the voice input.

Each new voice action is associated with one or more trigger terms, which may be pronounced similar to trigger terms for other voice actions, or may be pronounced similar to other words that are not voice action actions. Thus, in some implementations, the system can bias an automatic speech recognizer such that the automatic speech recognizer is more likely to determine that a received voice input includes trigger terms for the new voice action. To bias the automatic speech recognizer, the platform may determine a context of the user device and may bias the automatic speech recognizer used to transcribe user speech to recognize trigger terms that are enabled for the context. For example, at a time when a user provides a spoken input to the user device, a context of the user device or of one or more applications installed on the user device may be determined. Voice actions that are available to be triggered can then be identified based on the context, and the automatic speech recognizer can be adjusted to bias recognition of the trigger terms in the spoken input.

In some implementations, biasing the speech recognition engine comprises adjusting one or more language models used by the automatic speech recognizer to generate transcriptions of user speech. For example, one or more recognition probabilities associated with trigger terms for new voice actions are adjusted to increase the likelihood that the trigger terms are recognized in speech data, or to increase a preference of the automatic speech recognizer to recognize the trigger terms of new voice actions over trigger terms of other voice actions. The trigger terms preferred by the automatic speech recognizer may include those trigger terms associated with voice actions that are enabled for a given status of the user device or applications operating on the user device. Additionally or alternatively, one or more recognition probabilities associated with semantically similar terms or trigger terms for unavailable (i.e., non-enabled) voice actions may be adjusted to decrease a likelihood that the semantically similar terms are recognized in speech data, or to decrease a preference of the automatic speech recognizer for the semantically similar terms. In other implementations, a general language model used by the speech recognition engine may be used to generate candidate transcriptions of user speech, and post-processing of the candidate transcriptions may be performed to bias the speech recognition. For example, after candidate transcriptions for user speech are generated, probabilities or confidence scores assigned to one or more of the candidate transcriptions may be adjusted to bias the speech recognition engine to select, as the transcription of an utterance, candidate transcriptions that include trigger terms for new voice actions over other candidate transcriptions that do not.

For example, an application developer may deploy a new "skip ads" voice action for a media player application previously installed at one or more user devices. By deploying the new voice action, users may be able to provide a spoken input including the trigger term "skip ads" to bypass ads being presented within the media player application. The application developer may also submit a context when the "skip ads" voice action may be triggered. After deployment of the voice action, a user having the media player application installed on their device may provide voice input to control the media player application. Based on a context of the user device of the user or of the media player application, the "skip ads" voice action may be identified as an application available for triggering at the time of the user's spoken input.

An automatic speech recognizer used by the platform to translate user speech may therefore be biased towards such that the automatic speech recognizer is more likely to detect the trigger term, "skip ads." The biased automatic speech recognizer may then be used to perform speech recognition on the voice input. Because the automatic speech recognizer had been biased toward the trigger term "skip ads," a voice input by the user that would have otherwise been transcribed as "scrimmage" may instead be transcribed as "skip ads," thereby leading to triggering of the "skip ads" voice action.

Innovative aspects of the subject matter described in this specification may be embodied in methods, systems, and computer-readable storage media configured to perform the actions of determining, by a voice action system, that a software application installed on a user device is compatible with a new voice action, wherein the software application is different from the voice action system and the new voice action is specified by an application developer of the software application; identifying, by the voice action system, one or more trigger terms for triggering the software application to perform the new voice action; biasing, by the voice action system, an automatic speech recognizer to prefer the identified one or more trigger terms of the new voice action over trigger terms of one or more other voice actions; obtaining, by the voice action system, a transcription of an utterance generated by the biased automatic speech recognizer; determining, by the voice action system, that the transcription of the utterance generated by the biased automatic speech recognizer includes a particular trigger term included in the identified one or more trigger terms; and triggering, by the voice action system, execution of the new voice action based at least on determining that the transcription of the utterance generated by the biased automatic speech recognizer includes the particular trigger term.

These and other embodiments may each optionally include one or more of the following features. In various examples, biasing the automatic speech recognizer to prefer the identified one or more trigger terms of the new voice action over trigger terms of one or more other voice actions comprises adjusting a language model used by the automatic speech recognizer in performing speech recognition such that the automatic speech recognizer using the adjusted language model has an increased likelihood of detecting trigger terms of the new voice action; triggering execution of the new voice action comprises triggering the software application to perform an action associated with the new voice action; triggering execution of the new voice action comprises: identifying a voice action intent for the new voice action, wherein the voice action intent comprises data that, when received by the software application, requests that the software application perform one or more operations for executing the new voice action; and providing the voice action intent to the user device, thereby requesting that the software application perform the one or more operations for executing the new voice action.

In various other examples, determining that the software application installed on the user device is compatible with the new voice action comprises: identifying a context associated with the new voice action, wherein the context specifies a user device status or software application status when the new voice action is enabled; receiving information indicating a status of the user device or of the software application installed on the user device; and determining that the software application installed on the user device is compatible with the new voice action based at least on determining that the information indicating the status of the user device or of the software application installed on the user device satisfies the context; the information indicating the status of the user device or of the software application installed on the user device comprises information indicating content presented at a display of the user device.

In various other examples, determining that the software application installed on the user device is compatible with the new voice action comprises: accessing metadata for the software application; and determining that the software application installed on the user device is compatible with the new voice action based at least on the metadata for the application; the biased automatic speech recognizer receives audio data corresponding to the utterance from the user device, and the biased automatic speech recognizer generates the transcription of the utterance based on performing speech recognition on the audio data corresponding to the utterance.

In various other examples, these and other embodiments may each optionally include one or more of the following: determining, by the voice action system, that the software application installed on the user device is compatible with one or more other voice actions; identifying, by the voice action system, one or more trigger terms for triggering the software application to perform the one or more other voice actions; and ranking, by the voice action system, the new voice action and the one or more other voice actions, wherein biasing the automatic speech recognizer to prefer the identified one or more trigger terms of the new voice action over trigger terms of one or more other voice actions comprises biasing the automatic speech recognizer based at least on the ranking.

In various other examples, these and other embodiments may each optionally include one or more of the following: receiving information indicating a status of the user device or of the software application installed on the user device; and ranking the new voice action and the one or more other voice actions based at least on the received information indicating the status of the user device or of the software application installed on the user device.

The methods and systems of this disclosure enhance voice action processing. Biasing an automatic speech recognizer to prefer trigger terms for voice actions over other terms increases the likelihood that a trigger term for a voice action will be detected in a voice command submitted by a user. Therefore, voice commands that would not result in triggering of a voice action if processed using an unbiased automatic speech recognizer can instead result in triggering of a voice action due to the detection of a trigger term in the voice command by the biased automatic speech recognizer. Enhancing voice action triggering in this manner improves the user experience, since voice commands provided by a user are more likely to be processed as voice actions. Thus, a user may avoid having to repeat voice commands that are not initially processed as voice actions, e.g., due to a trigger term not being identified in an initial voice command utterance. Similarly, the user experience is improved because voice commands provided by a user are more likely to be identified as triggering voice actions that are enabled for a particular device or application status. Thus, the user may avoid having to repeat voice commands that are not initially processed as triggering enabled voice actions, e.g., by avoiding the detection of a trigger term for a disabled voice action in an initial voice command utterance.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1A:
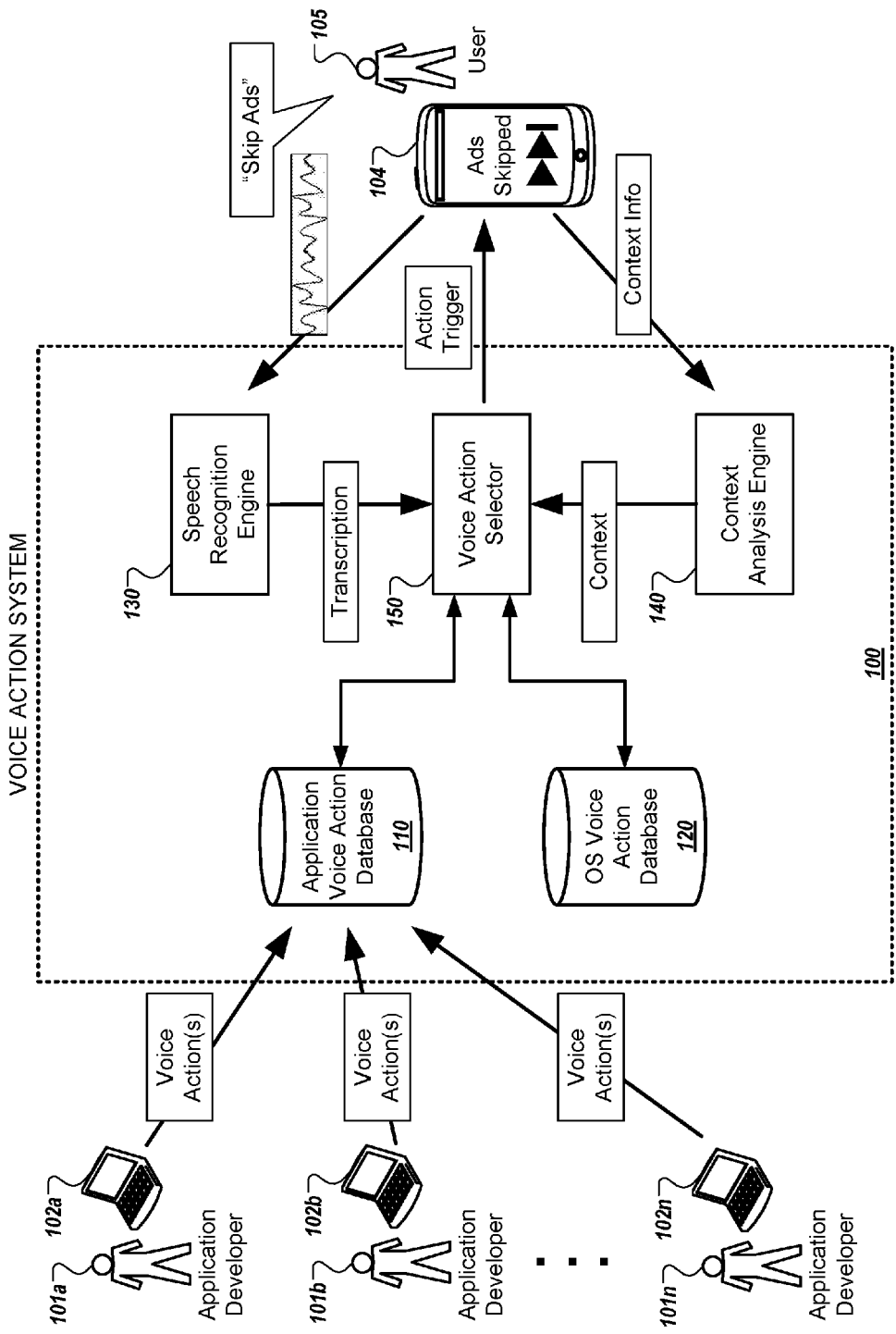
FIGS. 1A-1B depicts an example system for a voice action development system and service.

FIG. 1A illustrates an example of a voice action system 100. The voice action system 100 provides a platform and service whereby an application developer can establish a new voice action for an application that has previously been installed on one or more user devices. Thereafter, users having the application installed on their devices can use voice commands in order to cause the application to perform a specific operation as specified by the new voice action.

Figure 1B:
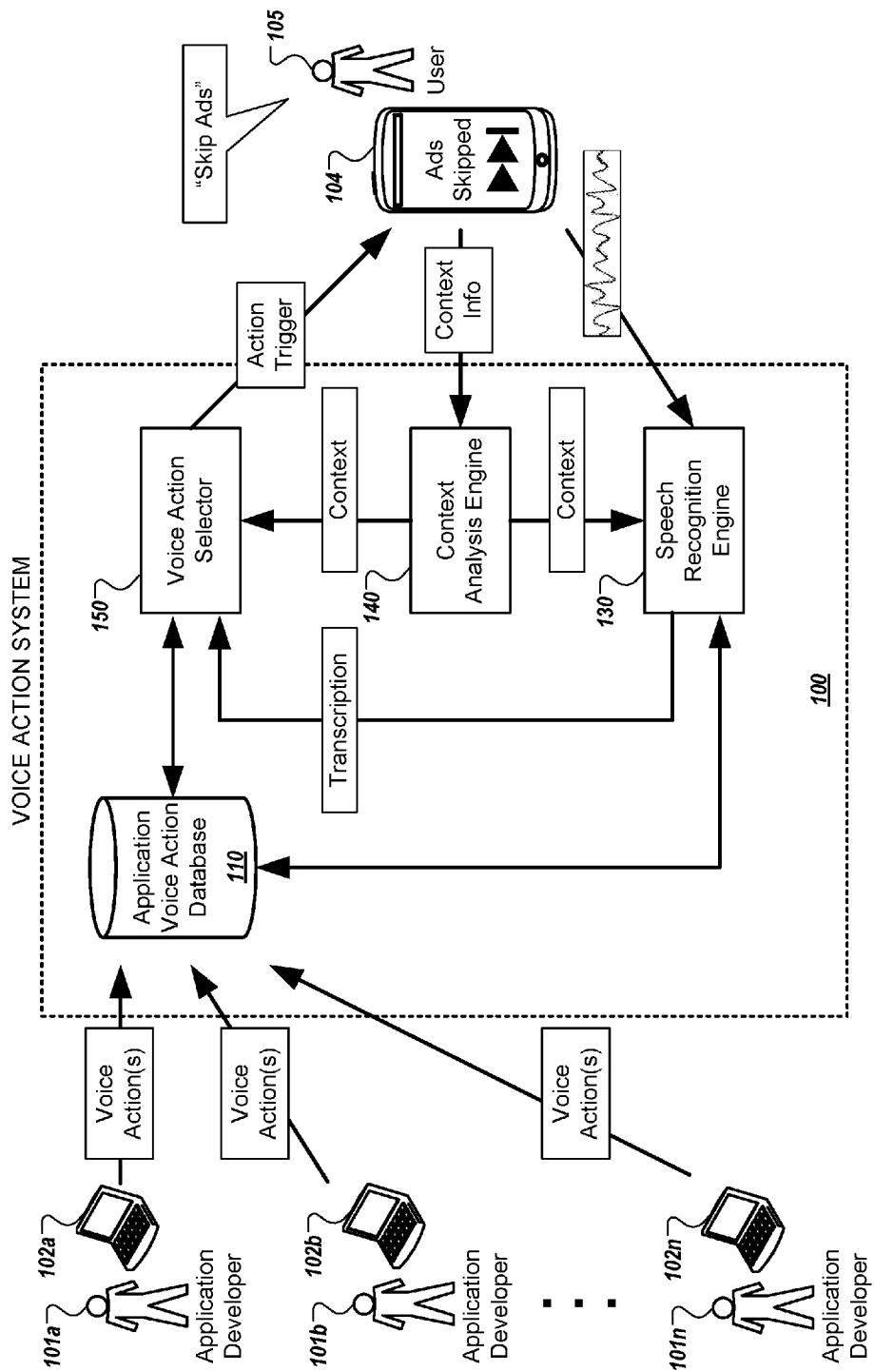
Figure 2:
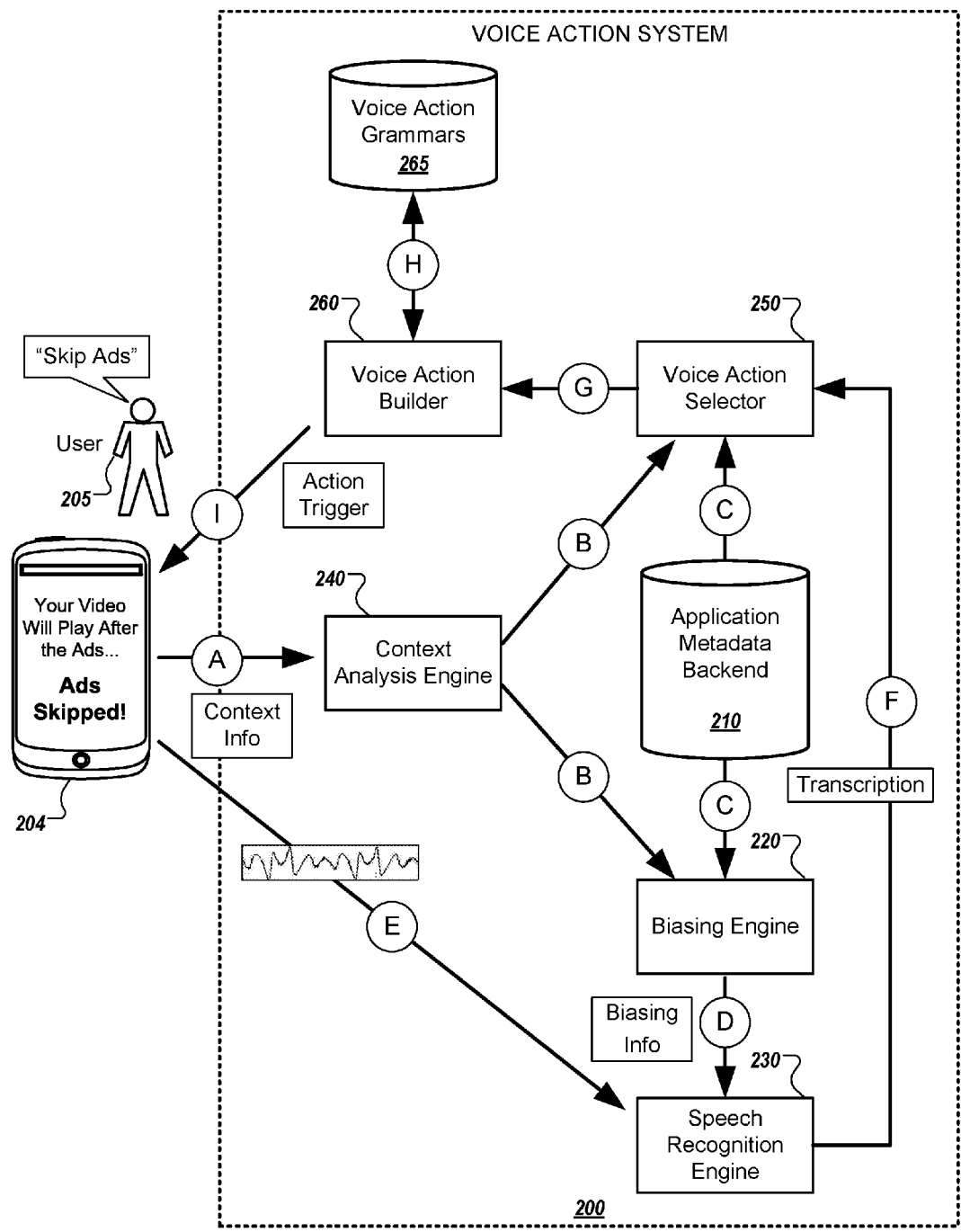
FIG. 2 depicts an example system for biasing a speech recognizer to detect voice actions trigger terms.

The voice action system 100 may also provide a platform, discussed in further detail with respect to FIGS. 1B and 2, for biasing an automatic speech recognizer to attune the automatic speech recognizer to trigger terms for the new voice action. When a user provides a voice command, the biased automatic speech recognizer can generate a transcription of the voice command utterance to determine whether the voice command utterance includes a trigger term for the new voice action. Automatic speech recognizer biasing therefore improves user experience by allowing for the triggering of the new voice action using trigger terms that might not otherwise be detected in a voice command utterance submitted by the user.

The voice action system 100 receives from terminals 102a-102n data defining new voice actions submitted by application developers 101a-101n, wherein the new voice actions are for one or more different applications. The voice action system 100 can determine whether each new voice action is a valid voice action. Each new voice action that is determined to be valid can be inducted to generate an intent corresponding to the new voice action, and the intent corresponding to the new voice action can be stored at an application voice action database 110 of the voice action system 100.

For example, the voice action system 100 may have a validation engine that receives and validates the data defining the new voice action. Validating the data may include determining that the formatting of the data defining the voice action complies with requirements, determining that the new voice action is compatible with the specified application, or otherwise determining that a voice action can be established based on the data received from the application developer 101a-101n. An induction engine of the voice action system 100 can receive the validated data defining the new voice action, and can induct the data to generate the intent corresponding to the new voice action. The intent can then be stored in the application voice action database 110.

The application voice action database 110 can store voice actions that pertain to activities or actions that can be performed within numerous different software applications. The voice actions included in the application voice action database 110 may include built-in voice actions that were submitted by application developers 101a-101n when the application was built, as well as new voice actions for performing operations supported by the application that were submitted by application developers 101a-101n after the application was built.

The voice actions can also include application-specific voice actions that are supported by default by the operating system. These pre-supported voice actions may be voice actions that are capable of being executed in applications without an application developer 101a-101n having to submit the voice action to the voice action system 100. For example, the voice action "exit application" to exit a task or activity running in the foreground may be automatically available for any application, and may be included in the application voice action database 110 for each application, without an application developer 101a-101n having to submit information to the voice action system 100 to define the "exit application" voice action.

In addition to the application voice action database 110, the voice action system 100 can include an operating system (OS) voice action database 120 that stores voice actions that are not associated with any particular application or context. For example, a "lock phone" voice action that causes a device to enter a locked state may be a voice action that is specified in the OS voice action database 120 as a voice action that is not associated with a particular application, or that is universally accessible, i.e., regardless of a device's or application's status when the "lock device" voice action is triggered. Generally, the voice actions stored in the OS voice action database 120 are voice actions that are not generated based on application developers 101a-101n defining the voice actions, since the voice actions stored at the OS voice action database 120 are generic to a user device operating environment and not any particular application generated by third party application developers 101a-101n.

The voice action system 100 enables a user 105 having a user device 104 to provide spoken voice input to their user device 104 to cause actions to be performed by the user device 104 or applications operating on their user device 104. For example, as shown in FIG. 1A, the user 105 having the user device 104 has a media player application running on their user device 104 and provides the spoken input "skip ads" while the media player application is running in the foreground of the user device 104 and is operating the media player application in an audio player mode.

Audio data corresponding to the spoken input and context information specifying a status of the user device 104, including the status of applications running on the user device 104, is transmitted to the voice action system 100. Specifically, for the example shown in FIG. 1A, the audio data corresponding to the voice input "skip ads" is received by a speech recognition engine 130 of the voice action system 100, and the context information indicating the status of the user device 104 is received by a context analysis engine 140 of the voice action system 100. The context information may indicate that the media player application is running in the foreground of the user device 104, that the media player application is currently in an audio player mode, and may indicate other information about the status of the user device 104 and applications installed on the user device 104.

The speech recognition engine 130 receives the audio data corresponding to the voice input, generates a transcription of the voice input, and provides the transcription of the voice input to the voice action selector 150. The context analysis engine 140 receives the context information from the user device 104 and processes the context information to determine relevant context information. For example, the context analysis engine 140 may analyze the context information to identify applications that are installed on the user device 104, and metadata associated with each of those applications may specify available voice actions for the application and context information that is relevant to determining which of the voice actions might be enabled for a given device or application status. In some instances, based on the analysis, the context analysis engine 140 may determine that additional context information is required to identify which voice actions should be enabled, and so the context analysis engine 140 may request additional context information from the user device 104. The context analysis engine 140 forwards the processed context information to the voice action selector 150.

For example, as shown in FIG. 1A, the speech recognition engine 130 may receive the audio data corresponding to the voice input "skip ads" and may obtain a transcription of the voice input. The context analysis engine 140 receives context information from the user device 104 specifying that the media player application is running in the foreground, that the media player application is operating in an audio player mode, and optionally providing other information about the status of the user device 104 or the media player application. For instance, the context information may also indicate that a social network application is operating in the background of the user device 104 and that the battery life of the user device 104 is currently 50%. The context analysis engine 140 may process the received context information to identify context information germane to selecting a voice action to trigger. For example, the context analysis engine 140 may receive information indicating that neither the media player application nor the social network application enables or disables particular voice actions based on a device battery life. Therefore, the context analysis engine 140 may filter the context information to indicate only that the media player application is operating in the foreground of the user device 104, that the media player application is in an audio player mode, and that the social network application is operating in the background of the user device 104. The filtered context information and the transcription of the voice input "skip ads" may then be provided to the voice action selector 150.

The voice action selector 150 receives the transcription of the spoken input from the speech recognition engine 130 and a context from the context analysis engine 140 that includes the processed context information. The voice action selector 150 uses the transcription and the context to identify a particular intent associated with a particular voice action to trigger at the user device 104. For example, the voice action selector 150 can access the application voice action database 110 and the OS voice action database 120 to identify a set of candidate voice actions that are enabled for the present context. Identifying the set of candidate voice actions can include identifying a set of intents stored at the application voice action database 110 or the OS voice action database 120 that specify contexts matching the context received by the voice action selector 150. Alternatively, identifying the set of candidate voice actions can include accessing metadata associated with one or more software applications that specifies voice actions and contexts in which the voice actions are enabled, where the metadata may be stored at the application voice action database 110, at the client device 104, or elsewhere. The voice action selector 150 may then identify candidate voice actions that are associated with a context that matches the context received from the context analysis engine 140.

Having identified the set of candidate voice actions that are enabled for the context, the voice action selector 150 can compare the transcription of the voice input to one or more trigger terms associated with each of the enabled voice actions. In general, a trigger term can include one or more words or other terms, and operates as an identifier for a voice action, such that detection of the one or more terms of a particular trigger term results in identification and triggering of the voice action corresponding to the particular trigger term. For instance, the voice action selector 150 can compare the transcription to respective trigger terms associated with the intents of the enabled voice actions. The voice action selector 150 identifies a particular intent for a particular voice action based on determining that the transcription matches a trigger term specified by the intent associated with the particular voice action. Alternatively, the voice action selector 150 may identify the particular intent for the particular voice action based on determining that the transcription matches a trigger term associated with the particular voice action that is specified in application metadata.

For example, the voice action selector 150 can receive the transcription of the voice input "skip ads" and the context, and can use the received context to identify candidate voice actions to initiate at the user device 104, i.e., voice actions that are enabled for the given context. After determining the set of candidate voice actions for the context, the voice action selector 150 compares the transcription of the voice input "skip ads" to trigger terms specified by the intents of the candidate voice actions. The voice action selector 150 can determine that the transcription "skip ads" matches the trigger term specified by the intent of the "skip ads" voice action for the media player application, and may therefore select the "skip ads" voice action for triggering.

The "skip ads" voice action may be a voice action for causing the media player application to skip advertisements that are presented to a user of the media player application before selected content is played. For example, after the user 105 has selected particular media content to be played at the user device 104, the user 105 may provide the "skip ads" voice action to cause the media player application to skip advertisements that would otherwise be presented before the selected content. Thus, if the media player application is loading advertisements or has begun presenting advertisements to the user 105, the user 105 may provide a voice command saying "skip ads" to bypass the advertisements and to begin playing of the selected content.

In some implementations, a transcription is identified as matching a trigger term based on determining that at least a portion of the transcription matches one or more words or other terms of the trigger term. For example, a match between a transcription and a trigger term may be identified based on each of the terms of the transcription matching each of the terms of the trigger term. In some implementations, a match may be identified based on determining that less than all of the terms of the transcription match terms of the trigger term. For example, a transcription may match a trigger term even if some of the terms of the trigger term are absent from the transcription, if the transcription includes terms in addition to those of the trigger term, or if one or more terms of the transcription are different from terms of the trigger term. Thus, as an example, each of the transcriptions "new email," "send new email," or "open up new email" may be identified as matching the trigger term "open new email," despite each of the transcriptions failing to precisely match the trigger term.

In some instances, a transcription may be identified as matching a trigger term if the transcription includes some or all of the words or other terms of the trigger term in a different order than the order specified by the trigger term. For example, the transcription "lock phone" may be identified as matching a "phone lock" trigger term. In some instances, a transcription may be identified as matching a trigger term based on determining that the transcription includes one or more synonyms or alternate terms for terms of the trigger term. Thus, the transcriptions "draft new email" or "open new email" may be identified as matching the trigger term "write new email" based on "draft" and "open" being classified as synonyms of "write."

Having identified the particular voice action, the voice action selector 150 provides action trigger data to the user device 104 that causes the activity or action associated with the particular voice action to be initiated. To do so, the voice action selector 150 can obtain information for controlling the user device 104 to perform the action or activity associated with the selected voice action. In some instances, controlling the user device 104 to perform the action or activity associated with the selected voice action can include firing an intent of the selected voice action. Firing the intent of the selected voice action may cause information for initiating the activity or action associated with the selected voice action to be provided to the user device 104.

For example, the intent for the selected voice action can include data that causes actions or activities associated with the voice action to be performed by the application associated with the voice action. The selected intent can be transmitted to the user device 104, such that receipt of the intent by the user device 104 can act as a request or can trigger performance of the actions or activities associated with the voice action. Alternatively, the voice action selector 150 can determine other data to operate as action trigger data that causes the selected voice action to be performed at the user device 104, and can transmit the information to the user device 104. For example, an intent may only identify the actions or activities to be performed by the user device 104 to perform the voice action, and the voice action selector 150 can determine action trigger data that can control the application on the user device 104 to perform the actions or activities associated with the voice action. The determined action trigger data can be transmitted to the user device 104 such that the action trigger data causes the actions or activities associated with the voice action to be performed. In some implementations, intents may be stored locally at the user device 104, the voice action selector 150 may transmit data to the user device 104 that identifies a particular intent to fire. The user device 104 may then fire the specified intent to perform the voice action.

For instance, after selecting the "skip ads" voice action from among the set of candidate voice actions, the voice action selector 150 transmits the intent for the "skip ads" voice action to the user device 104, or obtains other information for controlling the media player application running on the user device 104 to bypass advertisements being presented or about to be presented at the media player application. The voice action selector 150 transmits the data for controlling the media player application to skip the advertisements to the user device 104, which in turn initiates a process for the media player application running on the user device 104 to skip advertisements that are currently or about to be presented at an interface of the user device 105.

In some implementations, the one or more terminals 102a-102n corresponding to the one or more third party application developers 101a-101n can each be in communication with the voice action system 100 over one or more wired or wireless data connections, for example, over one or more networks. Each of the terminals 102a-102n can be a mobile device, such as a cellular phone, smartphone, tablet computer, laptop computer, personal digital assistant (PDA), netbook computer, or other mobile computing device, or may be any stationary computing device, such as a desktop computer or other stationary computer. A user device 104 associated with a user 105 can also be in communication with the voice action system 100 over one or more wired or wireless data connections, e.g., networks, where the user device 104 may also be a mobile or stationary computing device, such as a cellular phone, smartphone, tablet computer, netbook, personal digital assistant, laptop computer, desktop computer, or other computing device.

The example voice action system 100 shown in FIG. 1A includes an application voice action database 110, operating system (OS) voice action database 120, speech recognition engine 130, context analysis engine 140, and voice action selector 150. Each of the components of the voice action system 100, including the application voice action database 110, OS voice action database 120, speech recognition engine 130, context analysis engine 140, and voice action selector 150, may be in communication with one or more other components of the voice action system 100 over one or more wired or wireless data pathways, such as one or more networks, that enable that exchange of electronic communications. In some implementations, one or more of the components of the voice action system 100 may be combined such that their functions are performed by a single component, or may be represented by two or more components such that their functions are dispersed across the two or more components. The components of the voice action system 100 may be implemented on a single computing device, such as a single server system, or may be implemented on multiple computing devices that are in communication over one or more wired or wireless data pathways that enable the exchange of electronic communications between the components. Other alternative implementations of the system of FIG. 1A or the voice action system 100 may be implemented, for example, as disclosed in U.S. patent application Ser. No. 15/057,453, filed Mar. 1, 2016, which is hereby incorporated in its entirety.

FIG. 1B depicts an example voice action system that biases an automatic speech recognizer to facilitate voice action triggering. The voice action system of FIG. 1B can bias the automatic speech recognizer to more readily detect trigger terms of new voice actions. Furthermore, the voice action system of FIG. 1B can identify voice actions that are eligible for triggering, and can bias the automatic speech recognizer to more readily detect trigger terms of new voice actions that are eligible for triggering for a given user device or application status than trigger terms of other new voice actions that are not eligible for triggering for the given status.

Briefly, the voice action system 100 of FIG. 1B includes an application voice action database 110, a speech recognition engine 130, a context analysis engine 140, and a voice action selector 150, each as described with respect to FIG. 1A. In some implementations, the voice action system 100 can include additional or different components than those shown in FIG. 1B. For example, the voice action system may include an OS voice action database 120 as in FIG. 1A. The components 110, 130, 140, 150 of the voice action system 100 may communicate with one-another over one or more wired or wireless data pathways, such as one or more networks.

The voice action system 100 may be in communication with one or more terminals 102*a*-102*n* associated with one or more third party application developers 101*a*-101*n* who submit new voice actions to the voice action system 100 to enable the new voice actions for existing software applications developed by the third party application developers 101*a*-101*n*, i.e., applications that have been previously developed and that are installed on one or more user devices. Communications between the one or more terminals 102*a*-102*n* and the voice action system 100 may occur over one or more wired or wireless data pathways, for example, over one or more wired or wireless networks. The voice action system 100 may additionally exchange communications with one or more user devices, such as the user device 104 associated with the user 105. In some implementations, the voice action system 100 and user device 104 exchange communications over one or more wired or wireless data pathways, such as one or more networks.

As in FIG. 1A, the application developers 101*a*-101*n* may submit information to the voice action system 100 specifying new voice actions for software applications. For example, after an application developer 101*a*-101*n* has developed and deployed an application, and the application is installed on one or more user devices, the application developer 101*a*-101*n* submits information to the voice action system 100 using a terminal 102*a*-102*n* that specifies a new voice action. The voice action system 100 inducts the information specifying the new voice action, and stores information relating to the new voice action at the application voice action database 110. For example, an intent for the new voice action may be generated based on the induction process and stored at the application voice action database 110. Additionally, information pertaining to the new voice action may be generated and stored at the application voice action database 110 as application metadata. One or more voice action grammars for controlling a user device to perform the operations of the new voice action may also be generated and/or stored at the application voice action database 110.

Once a new voice action has been submitted to the voice action system 100 by the application developer 101*a*-101*n* and the new voice action has been inducted, the application developer 101*a*-101*n* may deploy the new voice action to enable triggering of the new voice action at a user device having the application installed. For example, the application developer 101*a*-101*n* may be able to test the new voice action by initially deploying the new voice action to one or more select user devices, and after successful testing of the new voice action or modification of the new voice action in response to the testing, the application developer 101*a*-101*n* can deploy the new voice action to enable triggering of the new voice action at all compatible user devices having the application installed.

For example, the third party application developer 101*a* of a media player application may submit information to the voice action system for a "skip ads" voice action that controls the media player application to skip advertisements or bypass the presentation of advertisements within the media player application. The data specifying the "skip ads" voice action is inducted and information such as an intent, metadata, or other information is added to the application voice action database 110 to enable use of the "skip ads" voice action. The application developer 101*a* may then test the "skip ads" voice action, for example, by selectively deploying the "skip ads" voice action to a limited number of users. After testing, the application developer 101*a* deploys the "skip ads" voice action to enable triggering of the "skip ads" voice action at all compatible user devices, such as the user device 104.

After the new voice action has been deployed, the user 105 may provide a voice command to trigger the new voice action at their user device 104. The user device 104 can transmit information relating to the voice command to the voice action system 100 for processing. For example, based on determining that the user 105 has provided a voice command, the user device 104 may determine context information and may provide the context information to the voice action system 100.

As described with respect to FIG. 1A, the context information may specify information about the user device 104 or information about one or more applications installed on the user device 104. Context information submitted to the voice action system 100 may include, for example, information specifying a make or model of the user device 104, an operating system of the user device 104, hardware components or capabilities of the user device 104, e.g., whether the user device 104 has a screen, a speaker, a headphone jack, an external display, etc., information about the status of the user device 104, e.g., a battery life of the user device 104, detected location of the user device 104, available memory or other storage capacity of the user device 104, etc.

The context information may also specify information about one or more applications installed at the user device 104. For example, the context information can identify one or more applications that are currently installed or currently running at the user device 104, an application that is operating in the foreground of the user device 104, one or more applications that are operating in the background of the user device 104, activities or tasks that one or more applications are currently performing, information indicating content being presented at a display of the user device 104 or that is being presented in a GUI of an application, or other information.

The user device 104 may additionally provide audio data corresponding to the voice command utterance of the user 105 to the voice action system 100. For example, the user device 104 may determine that the user 105 intends to provide a voice command in one of several ways, such as by determining that the user 105 user has selected a specific icon or pressed a specific control, that the user 105 has said a certain phrase indicative of a voice command, e.g., the phrase "OK Google," that the user 105 is likely to respond to a prompt for a voice command from the user device 105, e.g., in response to the user device 105 providing an audio output such as "say what you would like to do," or may otherwise determine that the user 105 intends to provide a voice input. In some implementations, the user 105 may confirm their intent to provide a voice command before audio data is obtained by the user device 104. The user device 104 may obtain and transmit audio data corresponding to the voice command utterance to the voice action system 100 for processing of the voice command.

The voice action system 100 receives the context information and the audio data corresponding to the voice command, and processes the context information and the audio data to identify and trigger a voice action. In some implementations, the context analysis engine 140 may receive the context information submitted to the voice action system 100 by the user device 104, and may process the context information to identify context information that is relevant to determining which voice action to trigger. As described with respect to FIG. 1A, processing the context information may involve the context analysis engine 140 filtering the context information received from the user device 104 to identify context information that is relevant to selecting a particular voice action to trigger. After processing the received context information, the context analysis engine 140 provides a context that includes the identified pertinent context information to one or more of the voice action selector 150 and the speech recognition engine 130.

For example, based on the user 105 providing the voice command "skip ads" to the user device 105, the user device 105 may determine context information and provide the determined context information to the voice action system 100. The context analysis engine 140 may receive the context information from the user device 104 and may process the context information to determine a context, i.e., to filter out less relevant context information. After processing by the context analysis engine 140, the context analysis engine 140 may provide a context to the voice action selector 150 and/or speech recognition engine 130, where, for example, the context specifies that the media player application is operating in the foreground of the user device 104, that the media player application is in an audio player mode, and that a social network application is running in the background of the user device 104.

One or more candidate voice actions are identified based on the context. In some examples, the voice action selector 150 identifies candidate voice actions based on the context. For example, the voice action selector 150 can receive the context from the context analysis engine 140 and can access the application voice action database 110 to identify voice actions that are compatible with the received context. To do so, the voice action selector 150 may compare the received context to conditions specified for one or more voice actions included in the application voice action database 110. The voice action selector 150 may identify candidate voice actions based on determining that the received context satisfies the conditions specified for those voice actions.

Alternatively, the speech recognition engine 130 may identify the one or more candidate voice actions based on a comparison of the context enablement conditions specified for the one or more voice actions included in the application voice action database 110. In still other examples, both the speech recognition engine 130 and voice action selector 150 can independently identify candidate voice actions based on comparing the context to the enablement conditions specified for the one or more voice actions. In addition to identifying candidate voice actions at the application voice action database 110, a similar process may be performed to identifying candidate voice actions at the OS voice action database 120 of FIG. 1A (not shown in FIG. 1B).

Returning to the example of FIG. 1B, the voice action selector 150 and/or the speech recognition engine 130 can identify candidate voice actions based on a comparison of the context specifying that the media player application is running in the foreground, that the media player application is in an audio player mode, and that the social network application is running in the background to conditions of one or more voice actions at the application voice action database 110. Based on the comparison, candidate voice actions may be identified, such as the "skip ads" voice action, a "next song" voice action, a "pause" voice action, and a "share song" voice action.

The candidate voice actions and/or information relating to the candidate voice actions is provided to the voice action selector 150 and the speech recognition engine 130. The speech recognition engine 130 is biased based at least on the candidate voice actions and/or information relating to the candidate voice actions. For example, one or more trigger terms may be identified for each of the candidate voice actions, and the speech recognition engine 130 may be configured based at least on the identified trigger terms to bias the speech recognition engine 130 to prefer the trigger terms of new voice actions over the trigger terms of other voice actions. For example, biasing the speech recognition engine 130 can involve configuring the speech recognition engine 130 to detect trigger terms for voice actions eligible for triggering over trigger terms for voice actions that are not eligible for triggering, or to detect trigger terms for voice actions eligible for triggering over other terms that are not trigger terms. In some examples, trigger terms for each of the candidate voice actions may be identified from intents corresponding to the candidate voice actions, may be identified from application metadata corresponding to the candidate voice actions, or may be identified from other information relating to the candidate voice actions.

Biasing the speech recognition engine 130 based on the candidate voice actions generally comprises biasing the speech recognition engine 130 to more readily identify trigger terms for the new voice actions. For example, the speech recognition engine 130 may be associated with one or more language models and one or more acoustic models for performing speech recognition on audio data corresponding to voice commands to generate transcriptions of the audio data. Biasing the speech recognition engine 130 may comprise adjusting one or more of the acoustic models or language models, to increase the probability that the trigger terms associated with new voice actions are identified when speech recognition is performed on utterance audio data and/or to increase the probability that candidate transcriptions that include identified trigger terms for the new voice actions are selected by the speech recognition engine 130 as transcriptions of the utterances.

For example, one or more of the acoustic models or language models may be statistical or probabilistic models, such as Hidden Markov models, dynamic time warping (DTW)-based speech recognition models, neural networks, deep feedforward neural networks (DNN), or recurrent neural networks. Biasing the one or more acoustic models or language models based on the candidate voice actions may comprise identifying a set of trigger terms that may be used to trigger one or more of the new voice actions, and modifying one or more of the acoustic models or language models such that the probability that transcriptions of audio data will include a trigger term of a new voice action is increased. In some implementations, modifying the one or more language models or acoustic models comprises modifying statistical values used by the models, or otherwise modifying the models, e.g., by removing or adding nodes or adjusting probabilities associated with edges between nodes in a Hidden Markov model. In some implementations, adjusting one or more language models or acoustic models may involve selecting or combining one or more particular language models or acoustic models to be used by the speech recognition engine 130. For example, the speech recognition engine 130 may have access to one or more different language models and/or acoustic models, and may select or combine selected language models and/or acoustic models to use for performing speech recognition based on the candidate voice actions.

In some implementations, to bias speech recognition to detect trigger terms for voice actions, the speech recognition engine 130 performs additional processing on candidate transcriptions generated for particular utterance audio data. For example, the speech recognition engine 130 may utilize a general or universal language model and a general or universal acoustic model to perform speech recognition to generate candidate transcriptions of an utterance. These general or universal models may be used by the speech recognition engine 130 for all users, e.g., such that speech recognition engines for different devices and/or users all use the same models, or these general or universal models may be tailored to a particular user, e.g., based on adaptation of the models to a particular user over time, such as based on machine learning. After generating the candidate transcriptions for the user utterance, post processing may be performed to bias the speech recognition engine 130 to select candidate transcriptions that include trigger terms for voice actions that are eligible to be triggered for a given context. In some instances, post processing involves adjusting probabilities or confidence scores assigned to candidate transcriptions, for example, by increasing the probabilities or confidence scores assigned to candidate transcriptions that include trigger terms for voice actions that are eligible to be triggered, and decreasing the probabilities or confidence scores assigned to candidate transcriptions that do not include trigger terms for voice actions that are eligible to be triggered. In some implementations, probabilities or confidence scores for an entire utterance may be adjusted. For example, a probability or confidence score assigned to the candidate transcription "skip ads that are playing" may be adjusted based on determining that the candidate transcription includes the trigger term "skip ads" that corresponds to a voice action that is eligible to be triggered for the given context. In other implementations, a probability or confidence score for a particular candidate term may be adjusted. For example, a probability or confidence score assigned to the term "skip" may be adjusted independently of other terms corresponding to other portions of the utterance, based on determining that the "skip ads" voice action is eligible for triggering, e.g., based on a received context.

As an example, the trigger terms "skip ads," "next song," "pause," and "share song" may be identified as candidate trigger terms, and the speech recognition engine 130 may be biased to improve the speech recognition engine's 130 ability to recognize those trigger terms. In some implementations, one or more acoustic models or language models used by the speech recognition engine 130 in performing speech recognition may be modified such that, for instance, the speech recognition engine 130 is more likely to detect the trigger term "pause" than the word "pasta" that is not identified as a trigger term. Alternatively, in other implementations, general or universal acoustic models or language models may be used by the speech recognition engine 130 to generate transcriptions of an utterance, and post processing may be performed on candidate transcriptions of the utterance to increase the probability that candidate transcriptions including the terms "skip ads," "next song," "pause," and "share song" are selected by the speech recognition engine 130 as the transcription of the utterance over other candidate transcriptions that do not.

The biased speech recognition engine 130 receives audio data corresponding to the voice command utterance provided by the user 105, and generates a transcription of the utterance. For example, audio data encoding the voice command utterance "skip ads" submitted by the user 105 may be transmitted from the user device 104 and received by the biased speech recognition engine 130. The biased speech recognition engine 130 may perform speech recognition on the received audio data to generate a transcription of the utterance.

In some implementations, because the speech recognition engine 130 has been biased to detect trigger terms for the candidate voice actions, including the trigger term "skip ads" associated with the "skip ads" voice action, the biased speech recognition engine 130 may generate the transcription "skip ads" and may assign the transcription a higher confidence score or probability of being accurate than if the speech recognition engine 130 had not been biased based on the candidate voice actions. Thus, if speech recognition was performed using an unbiased speech recognition engine 130, then a different transcription result may have been generated. For instance, an unbiased speech recognition engine 130 may identify two candidate transcriptions of the utterance, including the transcriptions "stop apps" and "skip ads," and may incorrectly elect the "stop apps" transcription due to that transcription being assigned a higher confidence score than the "skip ads" transcription. However, by biasing the speech recognition engine 130 before performing speech recognition, the "skip ads" transcription may be assigned a higher confidence score and therefore may be correctly identified as the transcription of the utterance.

The transcription generated by the biased speech recognition engine 130 is provided to the voice action selector 150, where the voice action selector 150 selects a particular candidate voice action to trigger. For example, as described with respect to FIG. 1A, the voice action selector 150 can receive information identifying the candidate voice actions as well as the transcription of the voice command utterance generated by the biased speech recognition engine 130. The voice action selector 150 may identify a particular candidate voice action to trigger based on detecting a match between the transcription and a trigger term specified for the particular candidate voice action. For instance, the voice action selector 150 may select the "skip ads" voice action for triggering in view of the transcription matching the trigger term "skip ads" specified for the "skip ads" voice action, and the transcription not matching the trigger term "pause" specified for the "pause" voice action.

In some examples, a transcription may match trigger terms associated with multiple candidate voice actions. In such a scenario, data may be transmitted to the user device 104 that causes a request to be presented to the user 105 to select a particular one of the multiple candidate voice actions to trigger. The voice action selector 150 may receive information indicating the user selection and may therefore elect the user-selected candidate voice action for triggering. In some implementations, a correlation between the trigger term and the selected and/or non-selected voice actions may be adjusted. For example, data stored at the application voice action database 110 may be updated based on the user selection to indicate that a particular trigger term is more related to the user-selected voice action, and to indicate that the particular trigger term is less related to the non-selected voice action. Such correlations may enable, for instance, the voice action selector 150 to select a particular candidate voice action to trigger even when a transcription matches trigger terms corresponding to multiple voice actions.

Based on a particular candidate voice action being selected, the voice action selector 150 or another component of the voice action system 100 provides data to the user device 104 that causes the selected candidate voice action to be triggered or executed. For example, the voice action selector 150 may access an intent for the selected candidate voice action, and may transmit the intent to the user device 104 as a request for the user device 104 to perform the voice action associated with the intent, e.g., by performing one or more operations or activities specified by the intent.

In other implementations, the voice action selector 150 may access information specifying activities or operations for performing the particular candidate voice action, and may provide instructions to the user device 104 that control the user device 104 to perform the specified activities or operations. For example, the voice action selector 150 may access an intent for the particular candidate voice action at the application voice action database 110 and may build the one or more operations necessary for executing the voice action using one or more grammars accessible to the voice action selector 150. Alternatively, the voice action selector 150 may access data, e.g., at the application voice action database 110, for instructing the user device 104 to perform the activities or operations necessary for executing the particular candidate voice action. The voice action selector 150 may then transmit information to the user device 104 instructing the user device 104 or an application installed on the user device to perform the activities or operations of the particular candidate voice action.

In still other examples, voice action intents may be stored locally at the user device 104, and the voice action selector 150 may transmit information to the user device 104 that identifies a particular candidate voice action to trigger. The user device 104 may receive the information specifying the particular candidate voice action, and may fire an intent corresponding to the particular candidate voice action to initiate execution of the activities or operations of the particular candidate voice action.

FIG. 2 depicts an example voice action system that biases an automatic speech recognizer to improve capabilities of the voice action system to trigger appropriate voice actions in response to user voice commands. For example, the voice action system 200 of FIG. 2, which includes a speech recognition engine 230 similar to the speech recognition engine 130 of FIGS. 1A and 1B, may be configured to bias the speech recognition engine 230 to more readily identify trigger terms corresponding to eligible voice actions.

Briefly, the voice action system 200 of FIG. 2 includes an application metadata backend 210, a biasing engine 220, a speech recognition engine 230, a context analysis engine 240 similar to the context analysis engine 140 of FIGS. 1A and 1B, a voice action selector 250 similar to the voice action selector 150 of FIGS. 1A and 1B, a voice action builder 260, and voice action grammars 265. The components 210, 220, 230, 240, 250, 260, 265 of the voice action system 200 may be in communication over one or more wired or wireless data pathways, such as one or more networks. The voice action system 200 may also receive data from and transmit data to a user device 204 associated with a user 205 over one or more wired or wireless data pathways, e.g., networks.

When the user 205 of the user device 204 provides a voice command to the user device 204, operations according to FIG. 2 may be performed to identify a voice action to trigger at the user device. As discussed, identification of the proper voice action to trigger is facilitated by biasing of the speech recognition engine 230.

When the user 205 provides a voice command to the user device 204, context information is determined by the user device 204 and is provided to the voice action system 200, where it is received by the context analysis engine 240 (step A). For example, the user 205 may speak the utterance "skip ads" to provide a voice command to the user device 204. In response to detecting the voice command, the user device 204 may determine context information for the user device 204 and/or software applications installed on the user device 204, e.g., that a media player application is operating in the foreground of the user device 204, that the media player application is operating in an audio player mode, that a social network application is operating in the background of the user device 204, and that a battery of the user device 204 is at 50% capacity. In some implementations, the context information may further identify or provide specific details relating to content presented at a display of the user device 104, such as search results or songs presented at the user device 104. The determined context information is transmitted to the voice action system 200 and received by the context analysis engine 240.

The context analysis engine 240 processes the received context information, and a context resulting from the processing is provided to each of the biasing engine 220 and voice action selector 250 of the voice action system (step B). For example, the context analysis engine 240 may process the context information received from the user device 204, and may determine that at least a portion of the context information is irrelevant to the processing of voice actions and can be excluded from the context. Thus, the context analysis engine 240 may omit the context information specifying that the battery of the user device 204 is at 50% capacity, and therefore may generate a context that specifies only that the media player application is operating in the foreground of the user device 204 and operating in an audio player mode, and that the social network application is operating in the background of the user device 204. The generated context is provided to the biasing engine 220 and the voice action selector 250.

Information at the application metadata backend 210 is accessed to identify candidate voice actions and trigger terms used to trigger the candidate voice actions (step C). Similar to the application voice action database, the application metadata backend 210 may include information relating to one or more voice actions. For example, the application metadata backend 210 may specify all of the voice actions available for each third party application (e.g., either installed on the user device 204 or generally available in an "application store" to any user). The application metadata backend 210 may also specify, for each voice action, one or more conditions that must be satisfied for the voice action to be enabled for triggering, as well as information specifying one or more trigger terms for triggering each of the voice actions.

For example, the application metadata backend 210 may include information relating to voice actions for both the media player application and the social network application that are installed on the user device 204. The application metadata backend 210 may specify numerous voice actions that a user may use to control each of the applications. Voice actions specified for the applications may each be associated with one or more conditions that a received context must satisfy for the voice action to be eligible for triggering. For example, the application metadata backend 210 may specify conditions required for a "skip ads" voice action for the media player application to be eligible for triggering. These conditions may require, for example, that the media player application be operating in the foreground of a user device and in an audio player mode. The application metadata backend 210 may further specify one or more trigger terms associated with the "skip ads" voice action, e.g., the trigger term "skip ads," that, when detected, causes triggering of the "skip ads" voice action.

The biasing engine 220 receives or accesses information stored at the application metadata backend 210, and based on the received information biases the speech recognition engine 230 (step D). In some implementations, biasing the speech recognition engine 230 comprises identifying trigger terms that are likely to be used for the given context, and biasing the speech recognition engine 230 to recognize those trigger terms more readily. For instance, the biasing engine 220 may identify, at the application metadata backend 210, a corpus of voice actions for each of the applications specified by the received context, e.g., voice actions available for each of the media player application and the social network application. The biasing engine 220 may then use the context to identify a subset of those voice actions that are eligible for triggering. For example, the biasing engine 220 may compare the context specifying that the media player application is operating in the foreground and is in an audio player mode, and that the social network application is operating in the background, and based on this context may identify a subset of candidate voice actions that are available for the given context. Trigger terms for the candidate voice actions are then identified at the application metadata backend 210.

The biasing engine 220 then provides information to the speech recognition engine 230 to bias the speech recognition engine 230. For example, based on identifying the available trigger terms for the set of candidate voice actions, the biasing engine 220 may provide biasing information to the speech recognition engine 230 to adjust one or more language models or acoustic models used by the speech recognition engine 230 in performing speech recognition. The biasing of the one or more language models or acoustic models may be performed as discussed with reference to FIG. 1B. In other examples, the biasing engine 220 provides biasing information to the speech recognition engine 230 that causes the speech recognition engine 230 to select candidate transcriptions that include trigger terms corresponding to the eligible set of voice actions over other transcriptions that do not include such trigger terms. Biasing of the speech recognition engine 230 in those instances may be performed as discussed subsequently with respect to FIG. 4.

In some implementations, biasing the speech recognition engine 230 based on the trigger terms for the candidate voice actions comprises ranking the candidate voice actions and/or the trigger terms for the candidate voice actions, and biasing the speech recognition engine 230 based on the ranking of the candidate voice actions and/or trigger terms. For example, the biasing engine 220 may rank the one or more candidate voice actions based on the received context, such as by ranking candidate voice actions associated with an application running in the foreground higher than voice actions associated with applications running in the background. The speech recognition engine 230 may then be biased less towards trigger terms for voice actions that are lower in the ranking and may be biased more strongly towards trigger terms for voice actions that are higher in the ranking.

Similarly, trigger terms that are more closely associated with particular candidate voice actions may be ranked higher in a ranking of trigger terms than other trigger terms that are less closely associated with particular candidate voice actions. Thus, the speech recognition engine 230 may be more strongly biased towards the higher-ranked trigger terms than the lower-ranked trigger terms. For instance, the application metadata backend 210 may include information indicating that a particular trigger term is more closely associated with a candidate voice action based on the voice action system 200 determining that the particular trigger term is used more often than other trigger terms to invoke the candidate voice action. As a result, the biasing engine 220 may bias the speech recognition engine 230 more strongly towards detection of the more often used trigger term than the other, less often used trigger terms.

The biased speech recognition engine 230 receives audio data corresponding to the voice command input by the user 205 (step E). For example, the user device 204 may detect the utterance of the user 204 providing the voice command, and can transmit audio data corresponding to the utterance to the voice action system 200 where it is received by the speech recognition engine 230. In some implementations, the audio data may be provided to the voice action system 200 before or concurrently with the context information, such that the speech recognition engine 230 already has the audio data when biasing of the speech recognition engine 230 is complete.

The biased speech recognition engine 230 performs speech recognition on the received audio data, and provides a transcription of the audio data to the voice action selector 250 (step F). For instance, after biasing of the speech recognition engine 230 is complete, the biased speech recognition engine 230 can perform speech recognition on the audio data encoding the voice command utterance submitted by the user 204. Biasing the speech recognition engine 230 may increase the likelihood of the generated transcription including a voice action trigger term for a candidate voice action.

For example, an unbiased speech recognition engine 230 that performs speech recognition on the voice command utterance of the user might generate two candidate transcriptions "skip ads" and "stop apps," and might select the "stop apps" transcription based on a confidence value assigned to that transcription being higher than a confidence value assigned to the "skip ads" transcription. Thus, the voice command input by the user 204 may not have any effect if the "stop apps" transcription is not a trigger term for a candidate voice action. However, the biased speech recognition engine 230 may generate the two candidate transcriptions "skip ads" and "stop apps" of the audio data, but select the transcription "skip ads" as the transcription to provide to the voice action selector 250 based on biasing of the speech recognition engine 230 resulting in a higher confidence value being assigned to the "skip ads" transcription than the "stop apps" transcription.

The voice action selector 250 receives the transcription and uses the transcription and the other accessed information to identify a voice action to trigger (step G). For example, voice action selector 250 can receive the context information from the context analysis engine 240 (step B), and based on information accessed at the application metadata backend 210 (step C), can identify one or more candidate voice actions and trigger terms corresponding to those candidate voice actions. Alternatively, the voice action selector 250 may receive information from the biasing engine 220 or speech recognition engine 230 that identifies the candidate voice actions and their corresponding trigger terms. The voice action selector 250 then identifies a particular voice action to trigger by comparing the received transcription of the utterance to the trigger terms for the candidate voice actions. Based on determining that the transcription matches a particular trigger term, the voice action selector 250 identifies the candidate voice action corresponding to the particular trigger term and provides information to the voice action builder 260 that identifies the identified voice action.

In some examples, matches between trigger terms and transcriptions may be identified even if the matches are not complete. For example, the voice action selector 250 may be capable of determining that a transcription matches a trigger term even if the transcription does not include all of the terms of the trigger term. The voice action selector 250 may also be capable of determining that a transcription matches some portions of a trigger term and does not match other portions of the trigger term, and may nevertheless identify the transcription as matching the other portions of the trigger term. Thus, for example, the transcriptions "skip" or "skip commercials" may still be identified as matching the "skip ads" trigger term. Based on detecting this match, the voice action selector 250 may select a voice action corresponding to the matched trigger term.

In some implementations, after the voice action selector 250 identifies the voice action to trigger, the voice action builder 260 accesses the voice action grammars 265 to build the voice action and allow for its execution at the user device 204 (step H). For example, based on receiving information indicating that the "skip ads" voice action should be triggered, the voice action builder 260 may access voice action grammars 265 to retrieve or build operations performable by the media player application to perform the "skip ads" voice action. In some implementations, building the voice action may involve selecting, modifying, or generating an intent that, when received by the user device 204, requests that the user device perform operations specified by the intent to perform the voice action. In other implementations, the voice action builder 260 may generate or identify specific instructions to provide to the user device 204 for controlling an application installed on the user device 204 to perform operations necessary to achieve the voice action.

In some examples, building the voice action comprises building operations that are performed on one or more content elements presented to the user 205 at the user device 204. For example, if a selected voice action refers to specific content being presented at the user device 204, e.g., a voice action to "play second song" when the user device 204 is displaying a list of songs, the voice action builder 260 may generate or modify an intent to allow for proper execution of the voice action. Thus, when building the voice action, the voice action builder 260 accesses information at the voice action grammars 265 that allows proper execution of the voice action, e.g., for selection and playing of a second item shown on the display of the user device 204.

The voice action builder 260 provides data to the user device 204 to trigger the voice action at the user device 204 (step I). For example, the voice action builder 260 may transmit an intent to the user device 204 to control the user device 204 to perform the voice action, or may transmit instructions to the user device 204 that control an application to perform operations for achieving the voice action.

Figure 3:
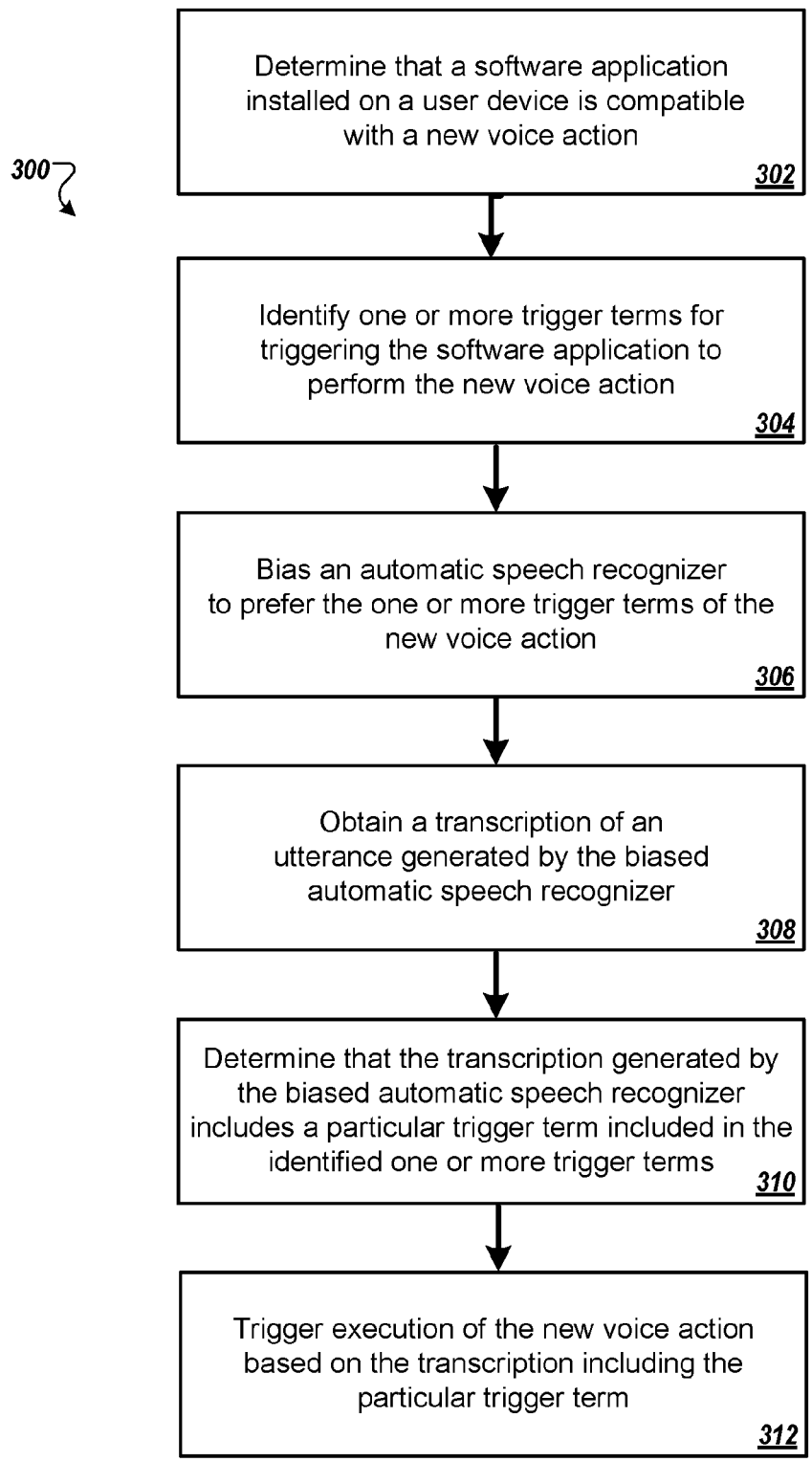
FIG. 3 is a flowchart of an example process associated with a voice action development system and service.

FIG. 3 is a flowchart of an example process 300 for triggering voice actions. In some implementations, the process 300 of FIG. 3 may be performed by the voice action system 100 of FIGS. 1A and 1B. The process 300 allows the voice action system 100 to process voice commands submitted by a user 105 with an increased probability that the voice commands will trigger new voice actions.

The process 300 comprises determining, by a voice action system, that a software application installed on a user device is compatible with a new voice action, wherein the software application is different from the voice action system and the new voice action is specified by an application developer of the software application (302). For example, the user 105 may provide a voice command at the user device 104, and context information submitted to the voice action system 100 in association with the received voice command may be used to determine whether a particular new voice action submitted by an application developer 101a-101n is compatible with the user device 104 at the time of the voice command. In some implementations, determining that the user device is compatible with the new voice action may comprise comparing a context of the user device 104 or of one or more applications installed on the user device 104 to one or more conditions required for the new voice action to be enabled for triggering. Based on the comparison, the voice action system 100 may determine that the context satisfies the one or more conditions and may therefore identify the user device as being compatible with the new voice action.

The voice action system identifies one or more trigger terms for triggering the software application to perform the new voice action (304). For example, based on determining that the new voice action is compatible with the user device 104 based on the comparison of the context to the one or more conditions required for the new voice action to be enabled, the or more trigger terms for triggering the new voice action may be identified.

The voice action system biases an automatic speech recognizer to prefer the identified one or more trigger terms of the new voice action over trigger terms of one or more other voice actions (306). For example, as discussed with respect to FIGS. 1B and 2, the speech recognition engine 230 of the voice action system 100 may be biased based on the identified one or more trigger terms to increase the probability that the speech recognition engine 230 will detect the presence of trigger terms for new voice actions in user-submitted utterances. Biasing the speech recognition engine 230 may involve adjusting one or more language models and/or acoustic models used by the speech recognition engine 230 in performing speech recognition. Biasing the speech recognition engine 230 may result in the speech recognition engine 230 being more likely to assign candidate transcriptions that include trigger terms for new voice actions confidence scores that increase the likelihood of those candidate transcriptions being selected as the transcription of an utterance.

The voice action system obtains a transcription of an utterance that is generated by the biased automatic speech recognizer (308). For example, the biased speech recognition engine 230 can receive audio data from the user device 104 that encodes the utterance of voice command by the user 105, and can perform speech recognition on the audio data to generate a transcription of the utterance.

The voice action system determines that the transcription of the utterance generated by the biased automatic speech recognizer includes a particular trigger term included in the identified one or more trigger terms (310). For example, after the biased speech recognition engine 230 generates a transcription of the utterance of the user 105, the biased speech recognition engine 230 can provide the transcription to the voice action selector 150. The voice action selector 150 can compare the transcription to each of the identified one or more trigger terms for triggering the new voice action, and can determine that at least a portion of the transcription matches a particular one of the one or more trigger terms for triggering the new voice action. In some implementations, detecting a match between a transcription and a particular trigger term may require only that the transcription substantially match the particular trigger term. For example, the transcription may include more words than the particular trigger term, synonyms of words included in the particular trigger term, or fewer words than the particular trigger term and may still be identified as matching the particular trigger term.

The voice action system triggers execution of the new voice action based at least on determining that the transcription of the utterance generated by the biased automatic speech recognizer includes the particular trigger term (312). For example, based on the voice action selector 150 determining that the transcription matches a particular trigger term included in the one or more identified trigger terms for triggering the new voice action, the voice action selector 150 may provide data to the user device 104 that triggers execution of operations associated with the new voice action. In some implementations, providing data to the user device 104 to trigger execution of the new voice action comprises transmitting an intent to the user device 104, where receipt of the intent by the user device requests that the user device perform operations specified in the intent to execute the voice action. Alternatively, the voice action system 150 may provide instructions to the user device 104 that directly control the user device 104 or an application operating on the user device 104 to perform the operations, thereby effecting execution of the voice action.

Further to the descriptions above, a user may be provided with controls allowing the user to make an election as to both if and when systems, programs or features described with respect to FIGS. 1A through 3 may enable collection of user information (e.g., information about a user's social network, social actions or activities, a user's preferences, or a user's current location), and if the user is sent content or communications from a server. In addition, certain data may be treated in one or more ways before it is stored or used, so that personally identifiable information is removed. For example, a user's identity or information received based on user input at a user device may be treated so that no personally identifiable information can be determined for the user. Thus, the user may have control over what information is collected about the user, how that information is used, and what information is provided to the user.

Figure 4:
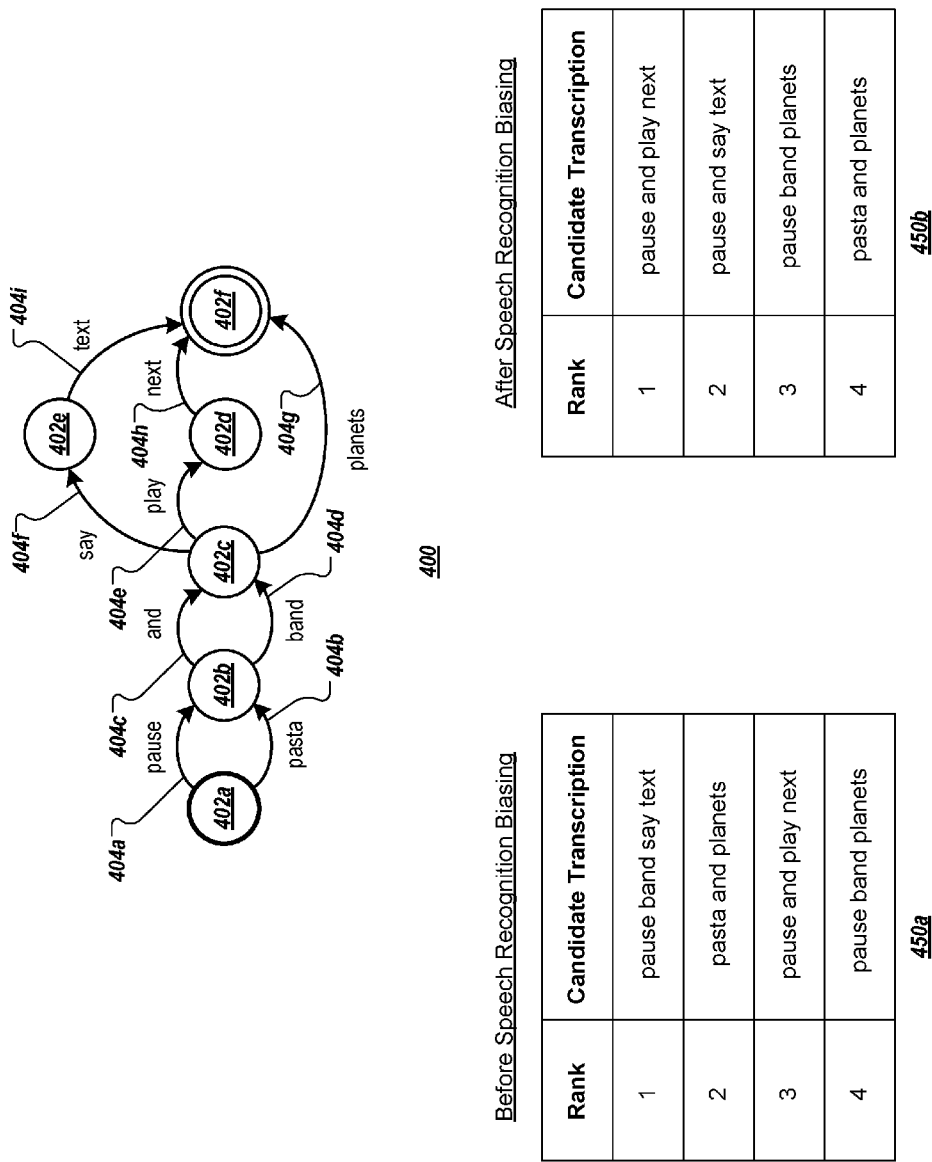
FIG. 4 depicts an example of speech recognition biasing according to one implementation.

FIG. 4 depicts a speech recognition biasing example according to one implementation. In FIG. 4, a speech recognition engine, such as the speech recognition engine 130 of FIGS. 1A and 1B, has received audio data corresponding to a user utterance, and based on the received audio data has generated a graph 400, i.e., a Markov Model or word lattice, representation of the user utterance. In the graph 400, each node 402a-402f corresponds to a connection between terms, and each edge 404a-404i, i.e., the connections between nodes 402a-402f, corresponds to a candidate term corresponding to a portion of the user utterance audio data. The graph 400 enables the speech recognition engine 130 to determine candidate transcriptions of the user utterance. While shown in FIG. 4 as having only the nodes 402a-402f, in some implementations the graph 400 may include additional edges and nodes, corresponding to other candidate terms and junctions between terms respectively for determining candidate transcriptions of the user utterance.

The speech recognition engine 130 can use the graph 400 to identify a set of candidate transcriptions of the user utterance. For example, in some implementations, the nodes 402a-402f and/or the edges 404a-404i of the graph 400 may each be associated with a probability indicating a determined confidence, i.e., a confidence score, (not shown) that the user utterance includes the particular term or connection between terms corresponding to that edge 402a-402f or node 404a-404i. Based on the graph 400, the speech recognition engine 130 can determine candidate transcriptions for the user utterance by finding paths in the graph that result in the highest probability. The speech recognition engine 130 can rank the candidate transcriptions based at least on the determined probabilities. For example, the speech recognition engine 130 can generate the graph 400 for the user utterance and can determine candidate transcriptions for the utterance including the transcriptions "pause band say text," "pasta and planets," "pause and play next," and "pause band planets." The speech recognition engine 130 can furthermore rank the candidate transcriptions based on probabilities assigned to the nodes 402a-402f and/or the edges 404a-404i. For example, without biasing the candidate transcription "pause band say text," may be ranked first, the candidate transcription "pasta and planets" second, the candidate transcription "pause and play next" third, and the candidate transcription "pause band planets" fourth, as shown in the ranking 450a. Additional candidate transcriptions (not shown) may also be included in the ranking 450a, where each candidate transcription is assigned an overall probability corresponding to an overall confidence based on its constituent nodes and edges.

The speech recognition engine 130 can perform biasing to favor candidate transcriptions associated with new voice actions. To accomplish biasing, the speech recognition engine 130 can perform post-processing on candidate transcriptions, modify the probabilities in the candidate transcription graph, or some combination of these.

Post processing of the candidate transcriptions can then be performed to favor candidate transcriptions that include trigger terms corresponding to the voice actions that are eligible for triggering. Specifically, probabilities or confidence scores assigned to the candidate transcriptions can be adjusted based on the presence or lack of trigger terms corresponding to eligible voice actions included in the candidate transcriptions. For example, based on a received context, a determination may be made that a "pause" voice action and a "play next" voice action are both eligible for triggering. The probabilities associated with the candidate transcriptions can then be adjusted base on the presence of the "pause" or "play next" trigger terms in the candidate transcriptions. For example, probabilities or confidence scores assigned to candidate transcriptions that include those trigger terms may be increased, while probabilities or confidence scores assigned to candidate transcriptions that do not include those trigger terms may be decreased.

After adjusting the probabilities or confidence scores assigned to the candidate transcriptions, a new ranking 450b can be determined that reflects biasing towards candidate transcriptions that feature trigger terms corresponding to voice actions that are eligible for triggering. For instance, based on probabilities assigned to candidate transcriptions that include the trigger terms "pause" or "play next" being increased, the ranking 450b can have the candidate transcription "pause and play next" ranked first, despite being ranked third in the ranking 450a before speech recognition biasing was performed. The candidate transcriptions "pause and say text" and "pause band planets" may be ranked second and third, respectively, based on the probabilities or confidence scores assigned to each being increased due to the presence of the trigger term "pause" in those candidate transcriptions. The transcription "pasta and planets," which was ranked second in the ranking 450a, may be fourth in the ranking 450b based on its probability being decreased or not being increased due to the absence of either of the trigger terms "pause" or "play next" in that candidate transcription.

Using these techniques, speech recognition can be biased to increase the probability that the speech recognition engine 130 will detect trigger terms in user utterances. Such an approach also has certain advantages, in that it does not require specific language models or acoustic models used by the speech recognition engine 130 to be modified or retrained to detect certain trigger terms over other terms. Rather, the outputs of language models and acoustic models used by the speech recognition engine 130 can be post processed to prefer candidate outputs that correspond to trigger terms for voice actions that are eligible for triggering. Such language models and acoustic models may be generic language and acoustic models used by the speech recognition engine 130, i.e., language and acoustic models that are not specific to any one user or device, or may be language and acoustic models that are specific to a single user or device, or group of users or devices, and that have been trained to increase the accuracy of speech recognition for those specific individuals or devices.

Alternatively or in addition to post processing, the speech recognition engine can bias candidate transcriptions by adjusting probabilities or confidence scores assigned to specific nodes or edges in a graph. Then, a different path is likely to result in the highest probability, and the different path is more likely to indicate a transcription for a new voice action. For example, based on "pause" being a trigger term for a voice action that is eligible for triggering, a probability or confidence score assigned to the edge 404a corresponding to the term "pause" may be adjusted to increase the probability that candidate transcriptions including the term "pause" will be identified and ranked higher in a ranking of candidate transcriptions. Thus, by applying biasing at the node-level or edge-level, a similar biasing result may be achieved as when biasing is performed at the candidate transcription level.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

While the foregoing embodiments have been predominantly described with reference to the development of voice actions for use with applications installed on user devices, the described features may also be used with respect to machines, other devices, robots, or other systems. For example, the voice action system 100 of FIGS. 1A and 1B may be utilized to develop and implement voice actions and discoverability examples for interacting with machinery, where the machinery has an associated computing system, may be used to develop and implement voice actions for interacting with a robot or system having robotic components, may be used to develop and implement voice actions for interacting with appliances, entertainment systems, or other devices, or may be used to develop and implement voice actions for interacting with a vehicle or other transportation system.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
    determining, by a voice action system, that a software application installed on a user device is compatible with a new voice action, wherein the software application is different from the voice action system and the new voice action is specified by an application developer of the software application;
    determining, by the voice action system, that the software application installed on the user device is compatible with one or more other voice actions;
    identifying, by the voice action system, one or more trigger terms for triggering the software application to perform the new voice action;
    identifying, by the voice action system, one or more trigger terms for triggering the software application to perform the one or more other voice actions;
    ranking, by the voice action system, the new voice action and the one or more other voice actions;
    biasing, by the voice action system, an automatic speech recognizer to prefer the identified one or more trigger terms of the new voice action over the trigger terms of the one or more other voice actions, wherein the automatic speech recognizer is biased based at least on the ranking;
    obtaining, by the voice action system, a transcription of an utterance generated by the biased automatic speech recognizer;
    determining, by the voice action system, that the transcription of the utterance generated by the biased automatic speech recognizer includes a particular trigger term included in the identified one or more trigger terms; and triggering, by the voice action system, execution of the new voice action based at least on determining that the transcription of the utterance generated by the biased automatic speech recognizer includes the particular trigger term.

2. The computer-implemented method of claim 1, wherein biasing the automatic speech recognizer to prefer the identified one or more trigger terms of the new voice action over trigger terms of one or more other voice actions comprises adjusting a language model used by the automatic speech recognizer in performing speech recognition such that the automatic speech recognizer using the adjusted language model has an increased likelihood of detecting trigger terms of the new voice action.

3. The computer-implemented method of claim 1, wherein triggering execution of the new voice action comprises triggering the software application to perform an action associated with the new voice action.

4. The computer-implemented method of claim 1, wherein triggering execution of the new voice action comprises:
identifying a voice action intent for the new voice action, wherein the voice action intent comprises data that, when received by the software application, requests that the software application perform one or more operations for executing the new voice action; and
providing the voice action intent to the user device, thereby requesting that the software application perform the one or more operations for executing the new voice action.

5. The computer-implemented method of claim 1, wherein determining that the software application installed on the user device is compatible with the new voice action comprises:
identifying a context associated with the new voice action, wherein the context specifies a user device status or software application status when the new voice action is enabled;
receiving information indicating a status of the user device or of the software application installed on the user device; and
determining that the software application installed on the user device is compatible with the new voice action based at least on determining that the information indicating the status of the user device or of the software application installed on the user device satisfies the context.

6. The computer-implemented method of claim 5, wherein the information indicating the status of the user device or of the software application installed on the user device comprises information indicating content presented at a display of the user device.

7. The computer-implemented method of claim 1, wherein determining that the software application installed on the user device is compatible with the new voice action comprises:
accessing metadata for the software application; and
determining that the software application installed on the user device is compatible with the new voice action based at least on the metadata for the application.

8. The computer-implemented method of claim 1, wherein the biased automatic speech recognizer receives audio data corresponding to the utterance from the user device, and wherein the biased automatic speech recognizer generates the transcription of the utterance based on performing speech recognition on the audio data corresponding to the utterance.

9. The computer-implemented method of claim 1 comprising:
receiving information indicating a status of the user device or of the software application installed on the user device; and
ranking the new voice action and the one or more other voice actions based at least on the received information indicating the status of the user device or of the software application installed on the user device.

10. The method of claim 1, wherein ranking the new voice action and the one or more other voice actions comprises ranking trigger terms.

11. The method of claim 1, wherein the new voice action and the one or more other voice actions are ranked based at least on probabilities.

12. A system comprising:
one or more computers and one or more storage devices storing instructions that are operable, when executed by the one or more computers, to cause the one or more computers to perform operations comprising:
determining, by a voice action system, that a software application installed on a user device is compatible with one or more other voice actions;
identifying, by the voice action system, one or more trigger terms for triggering the software application to perform the new voice action;
identifying, by the voice action system, one or more trigger terms for triggering the software application to perform the one or more other voice actions;
ranking, by the voice action system, the new voice action and the one or more other voice actions;
biasing, by the voice action system, an automatic speech recognizer to prefer the identified one or more trigger terms of the new voice action over the trigger terms of the one or more other voice actions, wherein the automatic speech recognizer is biased based at least on the ranking;
obtaining, by the voice action system, a transcription of an utterance generated by the biased automatic speech recognizer;
determining, by the voice action system, that the transcription of the utterance generated by the biased automatic speech recognizer includes a particular trigger term included in the identified one or more trigger terms; and
triggering, by the voice action system, execution of the new voice action based at least on determining that the transcription of the utterance generated by the biased automatic speech recognizer includes the particular trigger term.

13. The system of claim 12, wherein biasing the automatic speech recognizer to prefer the identified one or more trigger terms of the new voice action over trigger terms of one or more other voice actions comprises adjusting a language model used by the automatic speech recognizer in performing speech recognition such that the automatic speech recognizer using the adjusted language model has an increased likelihood of detecting trigger terms of the new voice action.

14. The system of claim 12, wherein triggering execution of the new voice action comprises triggering the software application to perform an action associated with the new voice action.

15. The system of claim 12, wherein triggering execution of the new voice action comprises:
identifying a voice action intent for the new voice action, wherein the voice action intent comprises data that, when received by the software application, requests that the software application perform one or more operations for executing the new voice action; and providing the voice action intent to the user device, thereby requesting that the software application perform the one or more operations for executing the new voice action.

16. The system of claim 12, wherein determining that the software application installed on the user device is compatible with the new voice action comprises:

identifying a context associated with the new voice action, wherein the context specifies a user device status or software application status when the new voice action is enabled;

receiving information indicating a status of the user device or of the software application installed on the user device; and determining that the software application installed on the user device is compatible with the new voice action based at least on determining that the information indicating the status of the user device or of the software application installed on the user device satisfies the context.

17. The system of claim 16, wherein the information indicating the status of the user device or of the software application installed on the user device comprises information indicating content presented at a display of the user device.

18. The system of claim 12, wherein determining that the software application installed on the user device is compatible with the new voice action comprises:

accessing metadata for the software application; and determining that the software application installed on the user device is compatible with the new voice action based at least on the metadata for the application.

19. The system of claim 12, wherein the biased automatic speech recognizer receives audio data corresponding to the utterance from the user device, and wherein the biased automatic speech recognizer generates the transcription of the utterance based on performing speech recognition on the audio data corresponding to the utterance.

20. A non-transitory computer-readable storage device storing software comprising instructions executable by one or more computers which, upon such execution, cause the one or more computers to perform operations comprising:

determining, by a voice action system, that a software application installed on a user device is compatible with a new voice action, wherein the software application is different from the voice action system and the new voice action is specified by an application developer of the software application;

determining, by the voice action system, that the software application installed on the user device is compatible with one or more other voice actions;

identifying, by the voice action system, one or more trigger terms for triggering the software application to perform the new voice action;

identifying, by the voice action system, one or more trigger terms for triggering the software application to perform the one or more other voice actions;

ranking, by the voice action system, the new voice action and the one or more other voice actions;

biasing, by the voice action system, an automatic speech recognizer to prefer the identified one or more trigger terms of the new voice action over trigger terms of one or more other voice actions, wherein the automatic speech recognizer is biased based at least on the ranking;

obtaining, by the voice action system, a transcription of an utterance generated by the biased automatic speech recognizer;

determining, by the voice action system, that the transcription of the utterance generated by the biased automatic speech recognizer includes a particular trigger term included in the identified one or more trigger terms; and triggering, by the voice action system, execution of the new voice action based at least on determining that the transcription of the utterance generated by the biased automatic speech recognizer includes the particular trigger term.

* * * * *